United States Patent
Tanaka

(10) Patent No.: US 6,954,536 B2
(45) Date of Patent: Oct. 11, 2005

(54) RF TRANSMITTER FOR BEING ATTACHED TO MICROPHONE

(75) Inventor: Kunihiro Tanaka, Kusatsu (JP)

(73) Assignee: SSD Company Limited, Shiga (JP)

( * ) Notice: Subject to any disclaimer, the term of this patent is extended or adjusted under 35 U.S.C. 154(b) by 404 days.

(21) Appl. No.: 10/055,000

(22) Filed: Jan. 25, 2002

(65) Prior Publication Data

US 2002/0102000 A1 Aug. 1, 2002

Related U.S. Application Data

(60) Provisional application No. 60/324,539, filed on Sep. 26, 2001.

(30) Foreign Application Priority Data

Jan. 26, 2001 (JP) .................................. 2001-000317 U

(51) Int. Cl.⁷ ............................................... H04B 3/00
(52) U.S. Cl. ........................... 381/77; 381/122; 455/95
(58) Field of Search .......................... 381/26, 122, 119, 381/111, 112, 113, 114, 115, 77, 79, 80, 81, 82; 455/95, 99, 91, 572

(56) References Cited

U.S. PATENT DOCUMENTS

5,054,115 A * 10/1991 Sawa et al. .................. 455/571

FOREIGN PATENT DOCUMENTS

| EP | 0 544 389 A1 | 6/1993 |
| JP | 08-163686 | 10/1996 |
| WO | 99/46957 | 9/1999 |

* cited by examiner

*Primary Examiner*—Ping Lee
(74) *Attorney, Agent, or Firm*—Arent Fox PLLC

(57) ABSTRACT

An RF transmitter for being attached to microphone includes a first connecting plug and a second connecting plug which are inserted into a microphone jack and an AV connector of a karaoke device with built-in microphone, respectively. The first connecting plug receives an electric power for driving a microphone of the karaoke device, and the second connecting plug receives an audio signal from the microphone. The power supplied to the first connecting plug is applied to an oscillating circuit provided on a transmitter, and in turn, the oscillating circuit is driven to modulate the audio signal inputted from the second connecting plug at a predetermined frequency. An FM-modulated audio signal is amplified, and then transmitted to an FM receiver from an antenna.

6 Claims, 6 Drawing Sheets

RF TRANSMITTER FOR BEING ATTACHED TO MICROPHONE

The present application claims the benefit of U.S. Provisional Application Ser. No. 60/324,539, filed Sep. 26, 2001.

BACKGROUND OF THE INVENTION

1. Field of the Invention

The present invention relates to an RF transmitter for being attached to microphone. More specifically, the present invention relates to an RF transmitter for being attached to microphone, which is attached to a microphone having a first jack capable of supplying an electric power to another microphone and a second jack for outputting an audio signal.

2. Description of the Prior Art

A conventional karaoke device with built-in microphone has a function to process karaoke (BGM) and sound inputted from the microphone and video image, and a function as a karaoke microphone. In such the karaoke device with built-in microphone, an AV cable is extended from a main body, and the AV cable includes two audio output terminals and a video output terminal. The two audio output terminals and the video terminal are connected to an AV terminal provided on a home television receiver. Accordingly, a video or image signal and audio or sound signals (L and R) from the karaoke device with built-in microphone are outputted from the television receiver. In this manner, a user can readily enjoy karaoke at home. In addition, by connecting the audio output terminal of the AV cable to another audio equipment such as a stereo amplifier or the like, a sound is outputted from a speaker of the audio equipment, and it is possible to enjoy karaoke viewing song lyrics sheets, for example.

However, in such a conventional prior art, since a karaoke device with built-in microphone and a television receiver or audio equipment are connected to each other by an AV cable, it is impossible to use them in a wireless environment. Due to this, a range of movement of a microphone (karaoke device with built-in microphone) is limited by length of the cable and etc., and there is a case that it is tedious to pass the microphone to a person in his or her turn.

SUMMARY OF THE INVENTION

Therefore, it is a primary object of the present invention to provide an RF transmitter for being attached to microphone allowing a non-wireless microphone to be used in a wireless environment.

The present invention is an RF transmitter for being attached to microphone, which is connected to a microphone having a first jack capable of supplying an electric power to another microphone and a second jack for outputting an audio signal, and comprises: a first connecting plug which is inserted into the first jack to receive the power; a second connecting plug which is inserted into the second jack to receive the audio signal; modulation means which receives the power and modulates the audio signal inputted from the second connecting plug; and transmitting means which receives the power and transmits the audio signal modulated by the modulation means to an RF receiver in a wireless manner.

An RF transmitter for being attached to microphone according to the present invention is attached to a microphone such as a karaoke microphone, which is driven by a dry battery, a secondary battery, and etc. The microphone has the first jack capable of supplying an electric power to another microphone such as an electrostatic microphone and the second jack for outputting an audio signal. The first connecting plug is inserted into the first jack to receive the electric power. The second connecting plug is inserted into the second jack to receive the audio signal inputted via the microphone. The power supplied to the first connecting plug and the audio signal received at the second connecting plug are applied to the modulation means. Therefore, the audio signal is modulated, and the modulated audio signal is transmitted in a wireless manner to the RF receiver by the transmitting means which receives the same power.

According to the present invention, since by receiving the power from the microphone, the audio signal can be modulated and transmitted to the RF receiver, it is possible to interlock a transmission control to a power control of the microphone, and to make the microphone wireless.

For example, if an audio signal is FM-modulated by the modulation means, the FM-modulated audio signal can be sent to the RF receiver (FM receiver).

In addition, the first jack has a first jack terminal connected to the power of the microphone and a second jack terminal connected to a first terminating resistor for terminating the microphone. Accordingly, when the RF transmitter is attached to the microphone, a first plug terminal included in the first connecting plug is connected to the first jack terminal. Therefore, the first plug terminal can receive the power from the first jack terminal to supply it to a power supply line. Furthermore, a second plug terminal included in the first connecting plug is connected to the second jack terminal to open the first terminating resistor. At this time, the microphone is terminated by a second terminating resistor accommodated in the RF transmitter.

In addition, because a diode having an anode connected to the power line and a cathode connected to a reference voltage (ground) is provided, it is possible to supply a stabilized power to the modulation means. That is, it is possible to modulate the audio signal at a desired frequency.

For example, if a light emitting diode is arranged to allow a light emission to be viewed from an external, a user is informed that an RF transmitter for being attached to microphone is driven by the power from the microphone.

In addition, since a microphone jack for receiving a microphone plug of further another microphone (additional microphone) different from the microphone is provided, it is possible to readily add a microphone for duet.

If the microphone plug of the additional microphone is inserted into this microphone jack, since the power is supplied from the first microphone jack terminal included in the microphone jack to the additional microphone, it is possible for the additional microphone to commonly use the power. That is, there is no need to provide a power source and a power supply mechanism on the additional microphone. At this time, a connection between the second jack terminal and the terminating resistor is opened, and therefore, the microphone and the additional microphone are terminated by the terminating resistor provided on the additional microphone.

Furthermore, the second jack of the microphone has a third jack terminal to receive a first audio signal (R) and a fourth jack terminal to receive a second audio signal (L). Therefore, when the second connecting plug is inserted into the second jack, a third plug terminal included in the second connecting plug is connected to the third jack terminal, and a fourth plug terminal is connected to the fourth jack terminal. That is, the first and second audio signals (R) and (L) are received from the third and the fourth plug terminals, respectively. Since the first and second audio signals (R) and (L) thus withdrawn are mixed at a mixing circuit, the modulation means can FM-modulate the mixed audio signal (monaural signal).

The above-described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
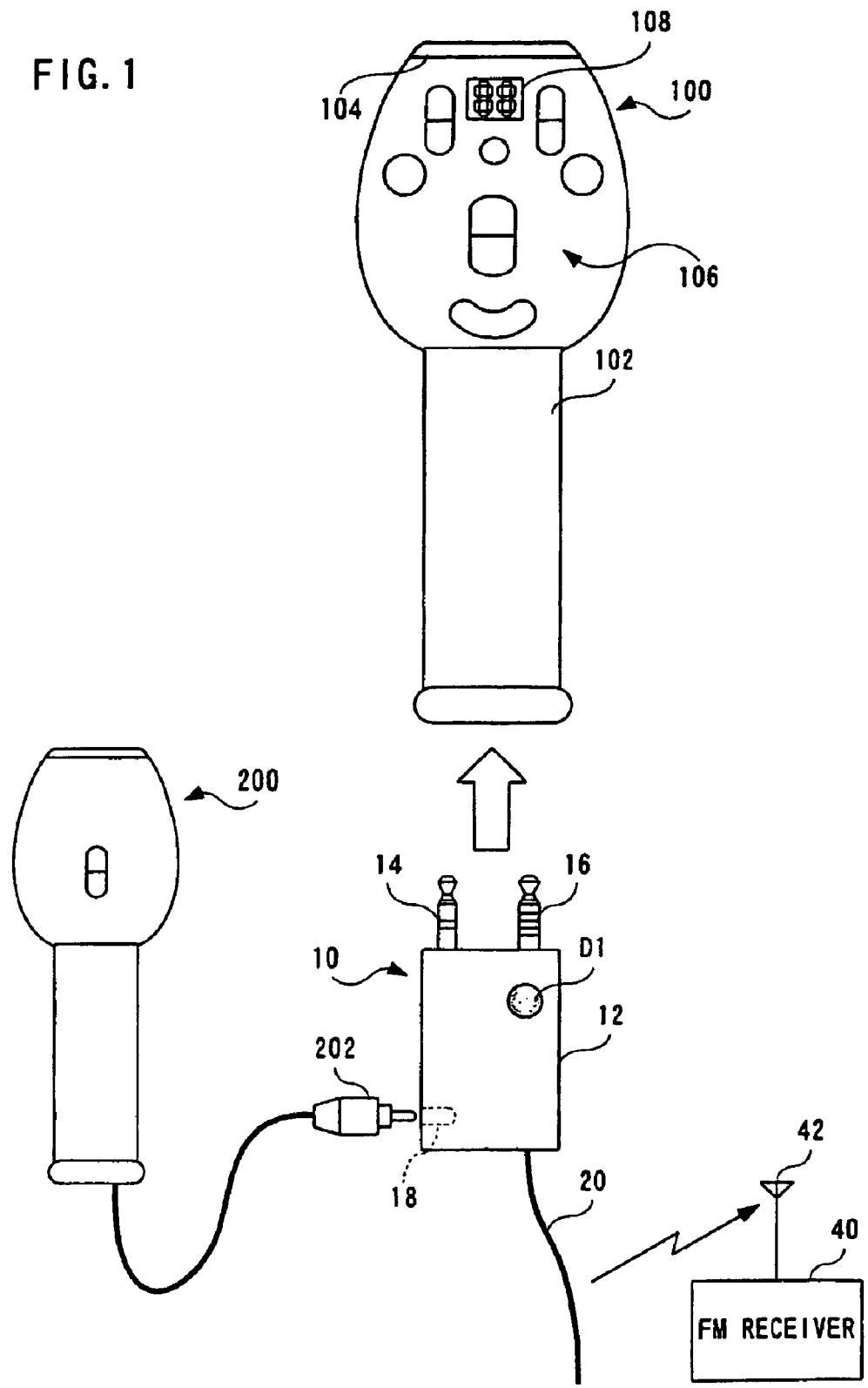
FIG. 1 is an illustrative view showing one embodiment of the present invention.

Referring to FIG. 1, an RF transmitter for being attached to microphone (hereinafter, may be simply referred to as "transmitter") 10 includes a housing 12. The transmitter 10 includes a first connecting plug 14 and a second connecting plug 16 which are exposed from the housing 12 and inserted into a karaoke device with built-in microphone 100 (trademark "e.kara").

It is noted that the respective first and second connecting plugs 14 and 16 are formed differently in shape and size so as not to be connected to the karaoke device with built-in microphone (hereinafter may be simply referred to as "karaoke device") 100 by mistake.

Meanwhile, the transmitter 10 is provided with a terminal (microphone jack) 18 into which a microphone plug 202 of a duet microphone (additional microphone) 200 sold as an attachment for the karaoke device 100 is inserted. The transmitter 10 is further provided with an antenna 20 exposed from the housing 12. Furthermore, the housing 12 is provided with a light-emitting diode D1 in an exposed manner.

It is noted that although the additional microphone 200 is shown smaller than the karaoke device 100, they are actually formed in the same or similar size.

Figure 2:
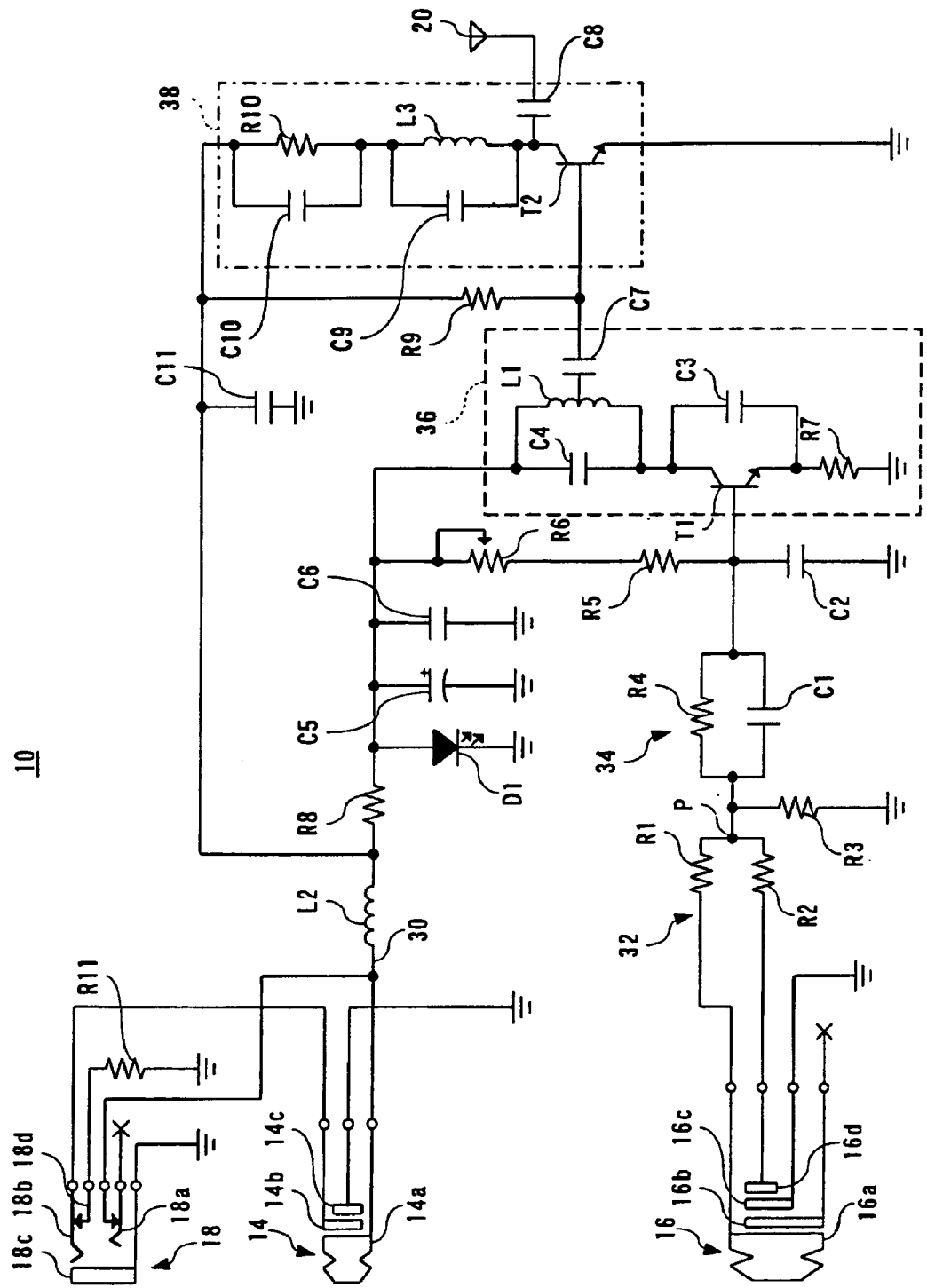
FIG. 2 is a circuit diagram showing a configuration of a transmitter shown in FIG. 1 embodiment.

An electrical configuration of the transmitter 10 is shown in FIG. 2. The first connecting plug 14 has a first, second, and third plug terminals 14a, 14b and 14c. Meanwhile, the second connecting plug 16 has a first, second, third, and fourth plug terminals 16a, 16b, 16c, and 16d. In addition, the microphone jack 18 includes two spring terminals 18a and 18b each of which is a cantilever leaf spring, and one ring terminal 18c. The spring terminals 18a and 18b are a first jack terminal and a second jack terminal, respectively, and the ring terminal 18c becomes a third jack terminal.

The first plug terminal 16a included in the second connecting plug 16 is connected to one end of a resistor R1. The second plug terminal 16b is a dummy. The third plug terminal 16c is connected to a ground. The fourth plug terminal 16d is connected to one end of a resistor R2.

Other end of the resistor R1 and other end of the resistor R2 are connected to each other, and a connecting point P thereof is connected with one end of a resistor R3. Other end of the resistor R3 is connected to a ground. The connecting point P is also connected with one end of a resistor R4 and one end of a capacitor C1. Other end of the resistor R4 and other end of the capacitor C1 are connected to each other, and a connecting point thereof is connected with one end of a resistor R5, one end of a capacitor C2 and a base of a transistor T1.

Other end of the resistor R5 is connected to one end of a variable resistor R6. Other end of the capacitor C2 is connected to a ground. An emitter of the transistor T1 is connected to a ground via a resistor R7, and a collector of the transistor T1 is connected to the emitter of the same transistor T1 via a capacitor C3. The collector of the transistor T1 is also connected with one end of a capacitor C4 and one end of a coil L1, and other end of the capacitor C4 and other end of the coil L1 are connected to each other. Then, a connecting point between the other end of the capacitor C4 and the other end of the coil L1 is connected with other end of the resistor R6.

The other end of the resistor R6 is also connected to the first plug terminal 14a and the spring terminal 18a via a resistor R8 and a coil L2. A connecting point between the resistor R6 and the resistor R8 is connected with an anode of the light-emitting diode D1 shown in FIG. 1, a plus terminal of an electrolytic capacitor C5 and one end of a capacitor C6. A cathode of the light-emitting diode D1, a minus terminal of the electrolytic capacitor C5 and other end of the capacitor C6 are connected to a ground.

Meanwhile, one end of a capacitor C7 is connected to a middle portion of the above-mentioned coil L1, and other end of the capacitor C7 is connected to a base of a transistor T2 and one end of a resistor R9. An emitter of the transistor T2 is connected to a ground, and a collector of the same transistor T2 is connected to the antenna 20 via a capacitor C8. A connecting point between the collector of the transistor T2 and the capacitor C8 is connected with one end of a capacitor C9 and one end of a coil L3.

Other end of the capacitor C9 and other end of the coil L3 are connected to each other, and a connecting point thereof is connected with one end of a resistor R10 and one end of a capacitor C10. Meanwhile, other end of the resistor R10 and other end of the capacitor C10 are connected to each other, and a connecting point thereof is connected to other end of the resistor R9. Meanwhile, a connecting point between the other end of the resister R10 and the other end of the capacitor C10 is connected to a ground through a capacitor C11, and connected to a connecting point between the coil L2 and the resistor R8.

Furthermore, the second plug terminal 14b included in the first connecting plug 14 is connected to the second jack terminal 18b included in the microphone jack 18. In addition, the third plug terminal 14c and the third jack terminal, i.e. the ring terminal 18c are connected to a ground.

In addition, the microphone jack 18 is provided with a contact point 18d which is electrically connected to the spring terminal 18b in a normal state, i.e. in a state the microphone plug 202 is not inserted into the microphone jack 18, and separated from the spring terminal 18b in a state the microphone plug 202 is inserted into the microphone jack18. Between the contact point 18d and a ground, a terminating resistor R11 for terminating a main body microphone 104 is inserted.

Returning to FIG. 1, the karaoke device 100 includes a housing 102 having an egg-shaped upper portion and a cylindrical lower potion, and a microphone 104 is mounted at an upper end of the egg-shaped portion of the housing 102. The karaoke device 100 of this embodiment functions not only as a karaoke device main body to process karaoke (BGM), microphone voices or sounds, and video images but also as a karaoke microphone.

Meanwhile, on an upper portion of the housing 102, i.e. the egg-shaped portion a plurality of key switches 106 such as a power switch, a reset switch and etc. and a display 108 formed of 7-segment LEDs of two digits are provided.

Noted that, because structure of the karaoke device 100 is described in detail in Registered Utility Model (Registration No. 3075809) that the assignee acquired a right first, detailed description of this embodiment will be omitted.

Figure 3:
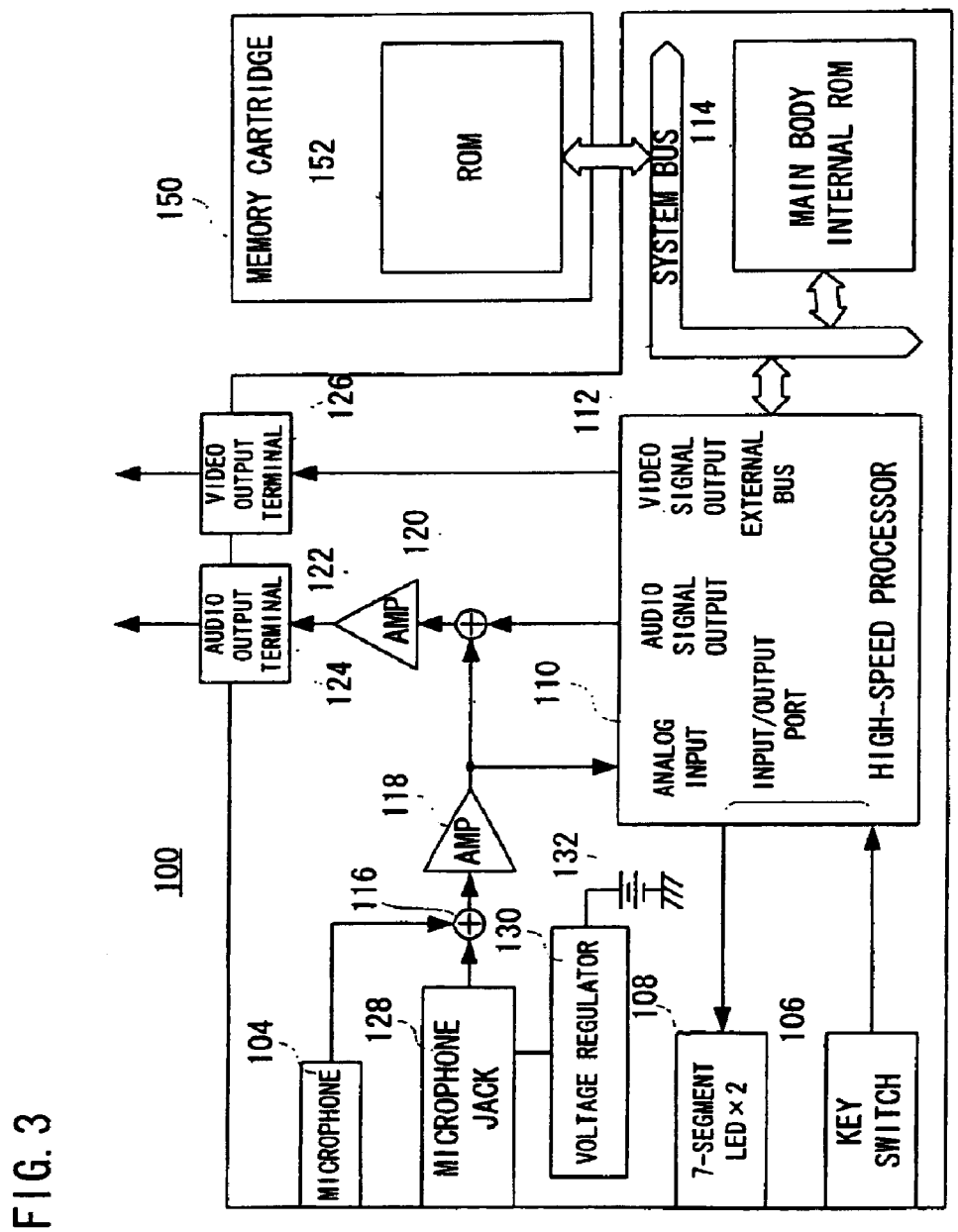
FIG. 3 is a block diagram showing an electrical configuration of a portable karaoke device shown in FIG. 1 embodiment.

Referring to FIG. 3, the karaoke device 100 includes a processor 110 accommodated inside the housing 102. An arbitrary kind of processor can be utilized as the processor 110; however in this embodiment a high-speed processor (trademark "XaviX") developed by the assignee of the present invention and already filed as a patent application is used. This high-speed processor is disclosed in detail in Japanese Patent Laying-open No. 10-307790 [G06F 13/36, 15/78] and U.S. patent application Ser. No. 09/019,277 corresponding thereto.

Although not shown, the processor 110 includes various processors such as a CPU, a graphic processor, a sound processor, a DMA processor and etc., and also includes an A/D converter used in fetching or taking-in an analog signal, and an input/output control circuit for receiving an input signal such as a key operation signal and an infrared signal, and applying an output signal to external devices. The CPU executes required arithmetic and logical operations in response to the input signals, and gives operation results to the graphics processor, the sound processor and etc. Therefore, the graphic processor and the sound processor execute image processing and sound processing according to the operation results.

A system bus 112 is connected to the processor 110, and an internal ROM 114 mounted on a circuit board (not shown) which is accommodated within the housing 102 together with the processor 110, and an external ROM 152 included in a memory cartridge 150 are connected to the system bus 112. Therefore, the processor 110 can access the ROMs 114 and 152 through the system bus 112, and can take-out video or image data and music data (score data for playing musical instruments) and so on from the ROMs 114 and 152.

As shown in FIG. 3, the audio signal from the microphone 104 is applied to an analog input of the processor 110 through a mixer 116 and an amplifier 118. An analog audio signal which is a result of the processing by the sound processor (not shown) of the processor 110 is outputted to an audio output terminal 124 through a mixer 120 and an amplifier 122. Furthermore, an analog video or image signal which is a result of the processing by the graphic processor (not shown) of the processor 110 is outputted to a video output terminal 126.

Furthermore, the karaoke device 100 is provided, inside the housing 102, with a microphone jack 128 which is a connecting terminal (jack) into which the first connecting plug 14 is inserted or an input terminal for additional microphone 200. The microphone jack 128 receives an audio signal from the additional microphone 200 which is directly connected thereto or connected via the transmitter 10. An audio signal from the main body microphone 104 and the audio signal from the additional microphone 200 are mixed with each other at the mixer 116 and inputted to the processor 110 from the amplifier 118.

It is noted that display data is applied from an output port of the processor 110 to the display 108 shown in FIG. 1, and all key switches 106 shown in FIG. 1 are connected to an input port of the processor 110.

Furthermore, the karaoke device 100 is provided with a voltage regulator 130, and the voltage regulator 130 receives a battery output from a battery 132 such as a dry battery or a secondary battery housed in the main body. The voltage regulator 130 applies a constant voltage power which is obtained by stabilizing the output voltage of the battery 132 to circuit components such as the main body microphone 104 and etc., and to the microphone jack 128.

It is noted that since the first connecting plug 14 of the RF transmitter 10 is inserted into the microphone jack 128 as shown in FIG. 1, the constant voltage power from the voltage regulator 130 is also applied to the RF transmitter 10 as will be described later in detail. Meanwhile the constant voltage applied to the transmitter 10 is also applied to the microphone 210 (FIG. 5) of the additional microphone 200 connected as necessary via the microphone jack 18 provided on the transmitter 10. Furthermore, in the case the additional microphone 200 is directly connected to the karaoke device 100, the constant voltage power from the microphone jack 128 is applied to the microphone 210.

In such the karaoke device 100, inputted voices from the microphone 104 (or both the microphone 104 and the microphone 210) is subjected to a predetermined process by the processor 110, and according to the music script (score) for each musical instrument for playing the BGM (karaoke) stored in advance in the ROM 114 and /or the external ROM 152, waveform data of each musical instrument is read out of the ROM 114 to be subjected to a predetermined process. Accordingly, aggregate audio signals (L) and (R) of BGM (karaoke) and sound of users (voices) are outputted to the sound output terminal (audio output terminal) 124 from the processor 110.

Noted that since the processing in the processor 110 is also described in detail in the above-described Registered Utility Model (Registration No.3075809), detailed description will be omitted in this specification.

Figure 4:
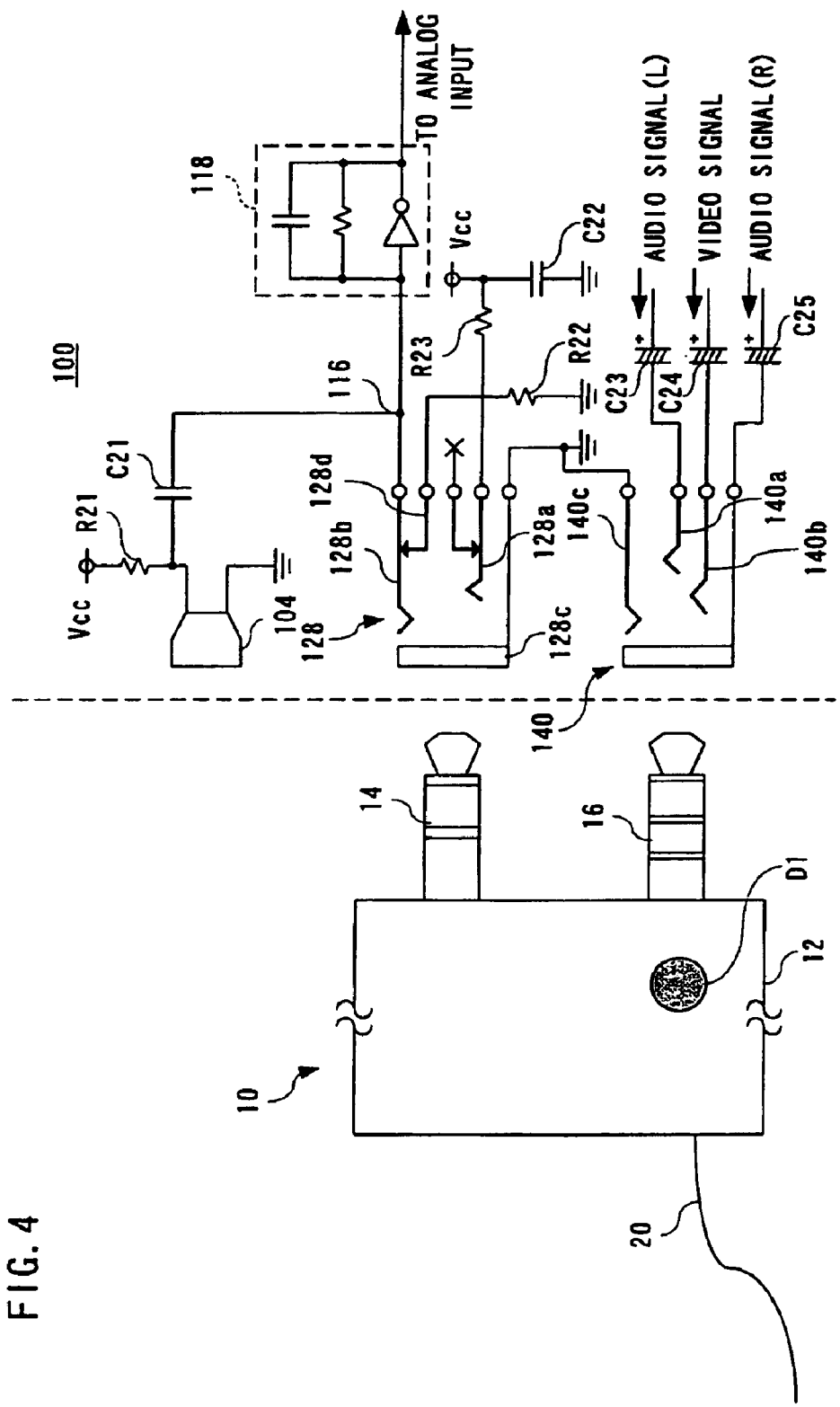
FIG. 4 is a circuit diagram showing a part of configuration of the portable karaoke device shown in FIG. 1 embodiment.

Next, referring to FIG. 4, the microphone jack 128 of the main body, i.e. the karaoke device 100 is constructed in a manner similar to the above-described microphone jack 18, and includes two spring terminals 128*a* and 128*b* and a ring terminal 128*c*. The spring terminals 128*a* and 128*b* are a first jack terminal and a second jack terminal, respectively, and the ring terminal 128*c* is a third jack terminal. The first jack terminal, i.e. the spring terminal 128*a* receives the constant voltage power Vcc from the voltage regulator 130 shown in FIG. 3.

It is noted that a capacitor C22 is a bypass capacitor.

Meanwhile, the second jack terminal, i.e. the spring terminal 128*b* is connected to an input terminal of the amplifier 118 through the mixer 116. In this embodiment, the mixer 116 is a connecting point. The main body microphone 104 is a condenser microphone in this embodiment, and the microphone 104 is applied with a drive voltage from the constant voltage power Vcc through a resistor R21. Then, the output audio signal from the microphone 104 is applied to the connecting point, i.e. the mixer 116 via a DC-cut capacitor C21. At the mixer, i.e. the connecting point 116, the audio signal from the additional microphone 200 inputted from the transmitter 10 through the second jack terminal 128*b* and the audio signal from the main body microphone 104 are mixed with each other in an analog manner as will be described later. Therefore, in a case that the additional microphone 200 is used, the amplifier 118 becomes to receive the mixed audio signal from more than two microphones. Furthermore, the third jack terminal, i.e. the ring terminal 128c is connected to a ground.

It is noted although in this embodiment an inverting amplifying circuit utilizing a NOT gate is used for a purpose of cost reduction, it is, of course, obvious that the amplifier 118 bay be formed of a conventional operational amplifier.

Meanwhile, the microphone jack 128 is provided with a contact point 128d which is electrically connected to the spring terminal 128b in a normal state, i.e. in a state that the first connecting plug 14 is not inserted into the microphone jack 128, and separated from the spring terminal 128b in a state the first connecting plug 14 is inserted into the microphone jack 128. Between the contact point 128d and a ground, a terminating resistor R22 for terminating the microphone 104 is connected.

In addition, a jack (stereo AV connector) 140 integrally formed with the audio output terminal 124 and the video output terminal 126 includes a first jack terminal 140a, a second jack terminal 140b and a third jack terminal 140c each of which is a cantilever leaf spring as described above, and a fourth jack terminal 140d being a ring terminal.

The first jack terminal, i.e. the spring terminal 140a is connected to the processor 110 through a capacitor C23 via the mixer 120 and the amplifier 122 shown in FIG. 3. Meanwhile, the second jack terminal, i.e. the spring terminal 140b is connected to the processor 110 shown in FIG. 3 through a capacitor C 24. Furthermore, the third jack terminal, i.e. the spring terminal 140c is connected to a ground together with the above-described spring terminal 128c. Then, the fourth jack terminal, i.e. the ring terminal 140d is connected to the processor 110 through a capacitor C25 via the mixer 120 and the amplifier 122 shown in FIG. 3.

It is noted that in this karaoke device 100, since it is possible to enjoy karaoke by connecting to two audio input terminals and a video input terminal of a television receiver with an AV cable (not shown) as described in detail in Registered Utility Model (Registration No. 3075809), the stereo AV connector (hereinafter may be simply referred to as "AV connector") 140 is constructed as shown in FIG. 4.

Meanwhile, in the case the karaoke device 100 is connected to the television receiver with the AV cable the microphone plug 202 of the additional microphone 200 connected as necessary is directly connected to the microphone jack 128.

For example, in the case the transmitter 10 is attached to the karaoke device 100, the first connecting plug 14 and the second connecting plug 16 are inserted into the microphone jack 128 and the AV connector 140, respectively.

Specifically, the first plug terminal 14a included in the first connecting plug 14 is inserted into the jack 128 through the ring terminal 128c of the microphone jack 128, and is brought into contact with the first jack terminal 128a to be electrically connected thereto. The second plug terminal 14b arranged in the rear of the first plug terminal 14a is inserted into the jack 128 through the ring terminal 128c, and is brought into contact with the second jack terminal 128b to be electrically connected thereto. At this time, the second plug terminal 14b raises the second jack terminal 128b upward to open an electrical connection between the second jack terminal 128b and the contact point 128d. Accordingly, when the first connecting plug 14 is inserted into the microphone jack 128, the terminating resistor R22 is opened. Furthermore, the third plug terminal 14c arranged in the rear of the second plug terminal 14b is also inserted into the jack 128 and is brought into contact with the third jack terminal 128c to be electrically connected thereto.

Meanwhile, the first plug terminal 16a included in the second connecting plug 16 is inserted into the inside of the AV connector 140 through the ring terminal 140d of the AV connector 140, and is brought into contact with the first jack terminal 140a to be electrically connected thereto. The second plug terminal 16b arranged in the rear of the first plug terminal 16a is inserted into the inside of the AV connector 140 through the ring terminal 140d, and is brought into contact with the second jack terminal 140b to be electrically connected thereto. The third plug terminal 16c arranged in the rear of the second plug terminal 16b is inserted into the inside of the AV connector 140 through the ring terminal 140d, and is brought into contact with the third jack terminal 140c to be electrically connected thereto. The fourth plug terminal 16d arranged in the rear of the third plug terminal 16c is brought into contact with the ring terminal 140d to be electrically connected thereto.

When the transmitter 10 is thus attached to the karaoke device 100, the constant voltage power Vcc from the voltage regulator 130 provided in the karaoke device 100 is withdrawn through a resistor R23, and is supplied from the first jack terminal 128a to an oscillating circuit 36, described later, and etc. via the first plug terminal 14a and a power supply line 30. At this time, although the terminating resistor R22 is opened by the second plug terminal 14b as described above, since the second plug terminal 14b and the second jack terminal 128b are connected with each other, as a result, the main body microphone 104 is terminated by the terminating resistor R11 (FIG. 2) connected to the second jack terminal 18b.

The audio signal (L) outputted from the first jack terminal 140a is applied to the first plug terminal 16a. The video or image signal outputted from the second jack terminal 140b is applied to the second plug terminal 16b. The audio signal (R) outputted form the fourth jack terminal 140d is applied to the fourth plug terminal 16d.

The inputted audio signals (L) and (R) are mixed with each other at the connecting point P of the resistor R1 and the resistor R2 as shown in FIG. 2. That is, they are mixed to each other at a mixing circuit 32 including the resistor R1 and resistor R2, and converted from stereophonic sound to a monophonic sound.

It is noted that since the transmitter 10 is attached to the karaoke device 100, a video or image signal is not outputted to external devices from the transmitter 10. That is, in the case that the karaoke device 100 is used as a wireless karaoke microphone, a user becomes to enjoy karaoke with reference to song lyric sheets. As described above, the video or image signal, in the case the AV cable and the television receiver are connected with the AV cable, can be outputted from the television receiver.

A converted monaural audio signal is applied to a pre-emphasis circuit 34 formed by connecting the resistor R3 and the capacitor C1 in parallel. In the pre-emphasis circuit 34, only a high-frequency range included in the audio signal is emphasized (amplified), and the audio signal that the high-frequency range is emphasized is applied to the oscillating circuit 36. The oscillating circuit 36, as enclosed by a one-dotted line in FIG. 2, includes the transistor T1, capacitors C3, C4 and C7, the resistor R1, and the coil L1.

On the other hand, as described above, the constant voltage power Vcc supplied from the first plug terminal 14a is applied to the oscillating circuit 36 through the power supply line 30 including the coil L2 and the resistor R8 connected to each other in series. Meanwhile, the light-emitting diode D1 is turned on by the constant voltage power Vcc and emits a light in a predetermined color (red in the embodiment). Since this light-emitting diode D1 is provided to be exposed from the housing 12 (FIG. 1) in a manner the light can be looked at from the outside, the light emission can inform that the transmitter 10 is turned on (operating state). In addition, since the light-emitting diode D1 has a cathode connected to a ground, the voltage of a constant value (constant voltage) can be supplied to the oscillating circuit 36 by utilizing a forward dropping voltage of the light-emitting diode D1.

Therefore, the oscillating circuit 36 can constantly oscillate at a predetermined oscillation frequency (80 MHz in the embodiment) to modulate the audio signal at that frequency. That is, the audio signal is FM-modulated, and a high-frequency signal (RF signal) is generated.

It is noted that the electrolytic capacitor C5 is inserted in parallel to the light-emitting diode D1 as an auxiliary of the light-emitting diode D1. Meanwhile, a noise component included in the constant voltage power Vcc is filtered by the capacitor C6. Furthermore, by changing a resistance value of the variable resistor R6, a base voltage of the transistor T1 can be varied, and thus, an oscillation frequency at the oscillating circuit 36 can be modified or changed.

The FM-modulated audio signal, i.e. the RF signal is withdrawn from the coil L1 and applied to an amplifying circuit 38 in a succeeding stage via a DC-cut capacitor C7. The amplifying circuit 38 includes the transistor T2, the capacitors C8, C9 and C10, the coil L3 and the resistor R10 enclosed by a one-dotted line in FIG. 2, and is applied with the constant voltage power Vcc from the first plug terminal 14a via the coil L2.

It is noted that a noise component included in the constant voltage power Vcc is filtered by the capacitor C11. Meanwhile, the coil L2 is provided to prevent the RF signal from the oscillating circuit 36 and the amplifying cirucui38 from flowing into the power supply side.

The RF signal, after amplified at the amplifying circuit 38, is applied to the antenna 20 through the capacitor C8, and transmitted from the antenna 20 to an FM receiver 40 as shown in FIG. 1. That is, the amplified RF signal (FM radio wave) is received by an antenna 42 connected to the FM receiver 40. Accordingly, an audio signal is outputted via an amplifier and a speaker both (not shown) after a predetermined process such as demodulation and etc. is executed in the FM receiver 40. That is, voices of a user singing to a BGM (karaoke) and its karaoke are outputted from the speaker.

Noted that the RF signal (FM radio wave) may be transmitted to audio equipment provided with an FM receiver, an amplifier and a speaker.

Furthermore, as shown in FIG. 1, the additional microphone 200 can be connected to the transmitter 10, and at this time, the microphone plug 202 provided on the additional microphone 200 is inserted into the microphone jack 18.

Figure 5:
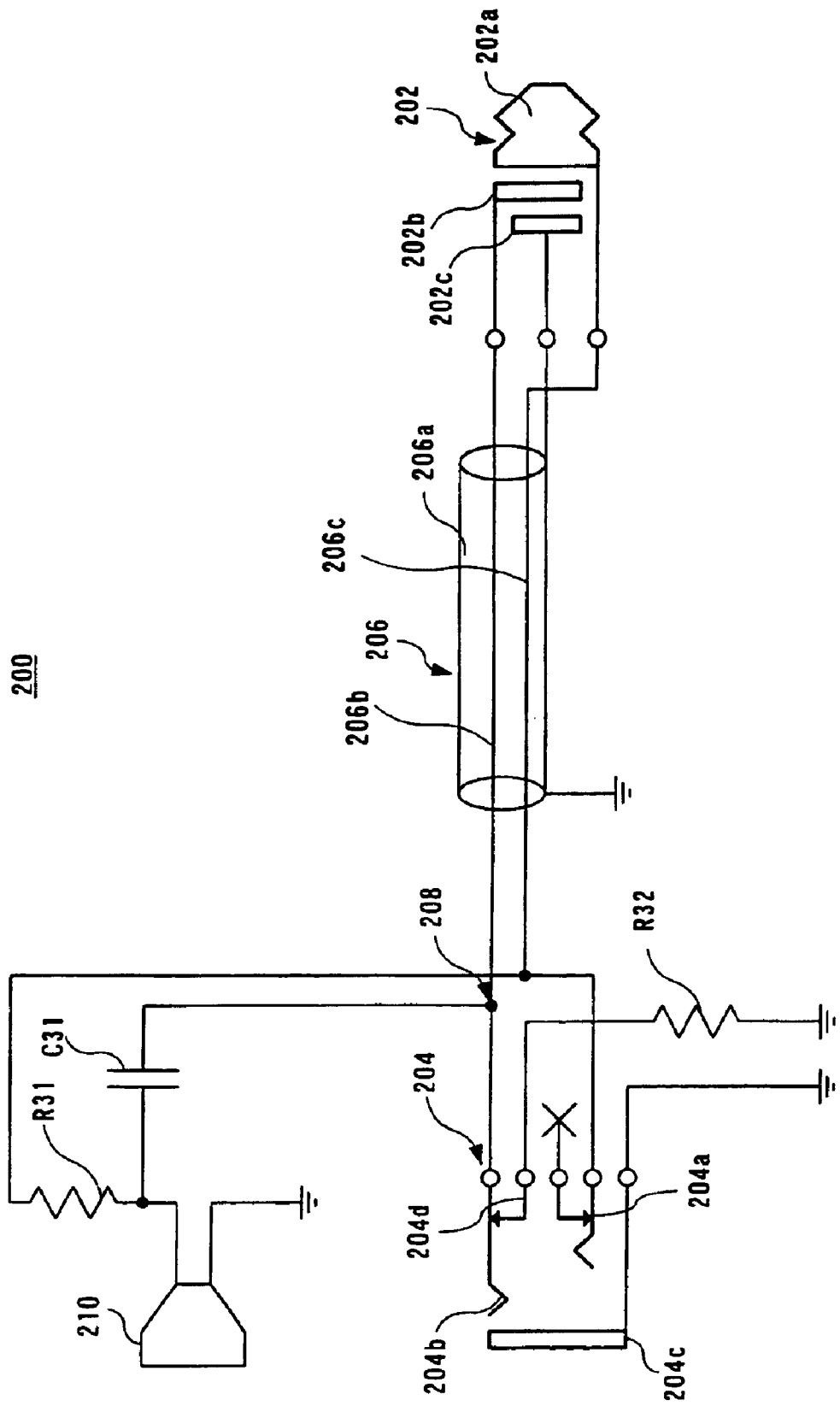
FIG. 5 is a circuit diagram showing a configuration of an additional microphone shown in FIG. 1 embodiment.

The additional microphone 200 is shown in detail in FIG. 5. More specifically, the additional microphone 200 has the microphone plug 202 inserted into the microphone jack 128 of the karaoke device 100, the microphone jack 18 of the transmitter 10 or a microphone jack 204 of another additional microphone 200.

As described above, in the case the AV cable is connected to the karaoke device 100, the microphone plug 202 is connected to the microphone jack 128.

This microphone plug 202 has a first, second, and third plug terminals 202a, 202b, and 202c. The first plug terminal 202a is inserted into the jack 18 through the ring terminal 18c of the microphone jack 18 of the transmitter 10, and is brought into contact with the first jack terminal 18a to be electrically connected thereto. The second plug terminal 202b arranged in the rear of the first plug terminal 202a is inserted into the jack 18 through the ring terminal 18c, and is brought into contact with the second jack terminal 18b to be electrically connected thereto. At this time, the second plug terminal 202b raises the second jack terminal 18b, and an electrical connection between the second jack terminal 18b and the contact point 18d is opened. Therefore, when the microphone plug 202 is inserted into the microphone jack 18, the terminating resistor R11 (FIG. 2) is opened. Furthermore, the third plug terminal 202c arranged in the rear of the second plug terminal 202b is brought into contact with the third jack terminal 18c to be electrically connected thereto.

The additional microphone 200 has the same microphone jack 204 as the microphone jack 18 of the transmitter 10 or the microphone jack 128 of the karaoke device 100. The microphone jack 204 includes two spring terminals 204a and 204b, and one ring terminal 204c. The spring terminals 204a and 204b are a first jack terminal and a second jack terminal, respectively, and the ring terminal 204c is a third jack terminal. The first jack terminal, i.e. the spring terminal 204a is connected to the first plug terminal 202a of the microphone plug 202 by a line 206c of a shield wire 206 shielded by a shield conductor 206a. That is, the spring terminal 204a becomes to receive the constant voltage power Vcc supplied from the karaoke device 100 to the transmitter 10 through the microphone plug 202, i.e. the first plug terminal 202a. Then, the second jack terminal, i.e. the spring terminal 204b is connected to the second plug terminal 202b through a mixer 208 by another line 206b of the shield wire 206. In this embodiment, the mixer 208 is also a connecting point similar to the mixer 116.

Furthermore, the microphone 210 is applied with the constant voltage power Vcc from the first plug terminal 202a as a drive voltage through a resistor R31. Then, the output audio signal from the microphone 210 is applied to the connecting point, i.e. the mixer 208 via a DC-cut capacitor C31. At the mixer, i.e. the connecting point 208, the audio signal from the further additional microphone 200 connected to the microphone jack 204 as necessary, which is inputted through the microphone plug 202 and the spring terminal 204b, and the audio signal from the microphone 210 are mixed each other.

In addition, the microphone jack 204 is provided with a contact point 204d which is electrically connected to the spring terminal 204b in a normal state, i.e. in a state that the microphone plug 202 is not inserted into the microphone jack 204, and separated from the spring terminal 204b in a state the microphone plug 202 is inserted. Between the contact point 204d and a ground, a terminating resistor R32 for the microphone 210 is connected.

It is noted that the ring terminal, i.e. the third jack terminal 204c is connected to the shield conductor 206a of the shield wire 206, and the third plug terminal 202c is also connected to the shield conductor 206a. Then, the shield conductor 206a is connected to a ground. That is, within an inside of the additional microphone 200, the third plug terminal 202c, the shield conductor 206a and the third jack terminal 204c are all connected to the ground.

In this embodiment, for example, in a case that the additional microphone 200 is connected as shown in FIG. 1, the transmitter 10 is attached to the karaoke device 100, and the microphone plug 202 of the additional microphone 200 is inserted into the microphone jack 18 of the transmitter 10. Accordingly, the first, second and third plug terminals 202a, 202b and 202c are connected to the first, the second and the third jack terminals 18a, 18b and 18c, respectively. At the same time, the second jack terminal 18b is raised by the second plug terminal 202b, and thus the second jack terminal 18b and the contact point 18d having been connected to each other by this time are separated from each other. Therefore, the terminating resistor R11 of the microphone 104 is opened.

Due to a fact that the first plug terminal 202a and the first jack terminal 18a are connected to each other, the constant voltage power Vcc having been given from the voltage regulator 130 (FIG. 3) to the first jack terminal 18a is applied to the first plug terminal 202a through the first jack terminal 18a, and as shown in FIG. 4 is, in turn, applied to the microphone 210 from the first plug terminal 202a as the drive power via the resistor R31 by the line 206b of the shield wire 206.

On the other hand, the audio signal from the main body microphone 104 is applied to the mixer 116 through the capacitor C21, and the audio signal from the microphone 210 of the additional microphone 200 is inputted through the capacitor C31 to the second plug terminal 202b through the mixer 208. The second plug terminal 202b reaches the mixer 116 through the second jack terminal 18b and the second plug terminal 14b as described above. Therefore, the audio signal from the main body microphone 104 is mixed with the audio signal from the microphone 210, and the mixed audio signal is amplified by the amplifier 118 and then inputted to the processor 110. Then, after a predetermined process is made, the audio signals (L) and (R) as described above are inputted to the transmitter 10 from the second connecting plug 16.

In the additional microphone 200, the second jack terminal 204b of the microphone jack 204 is still connected to the contact point 204d unless the microphone plug 202 of the further additional microphone 200 is inserted into the microphone jack 204. Therefore, two microphones 104 and 210 are terminated by the terminating resistor R32 (FIG. 5).

Figure 6:
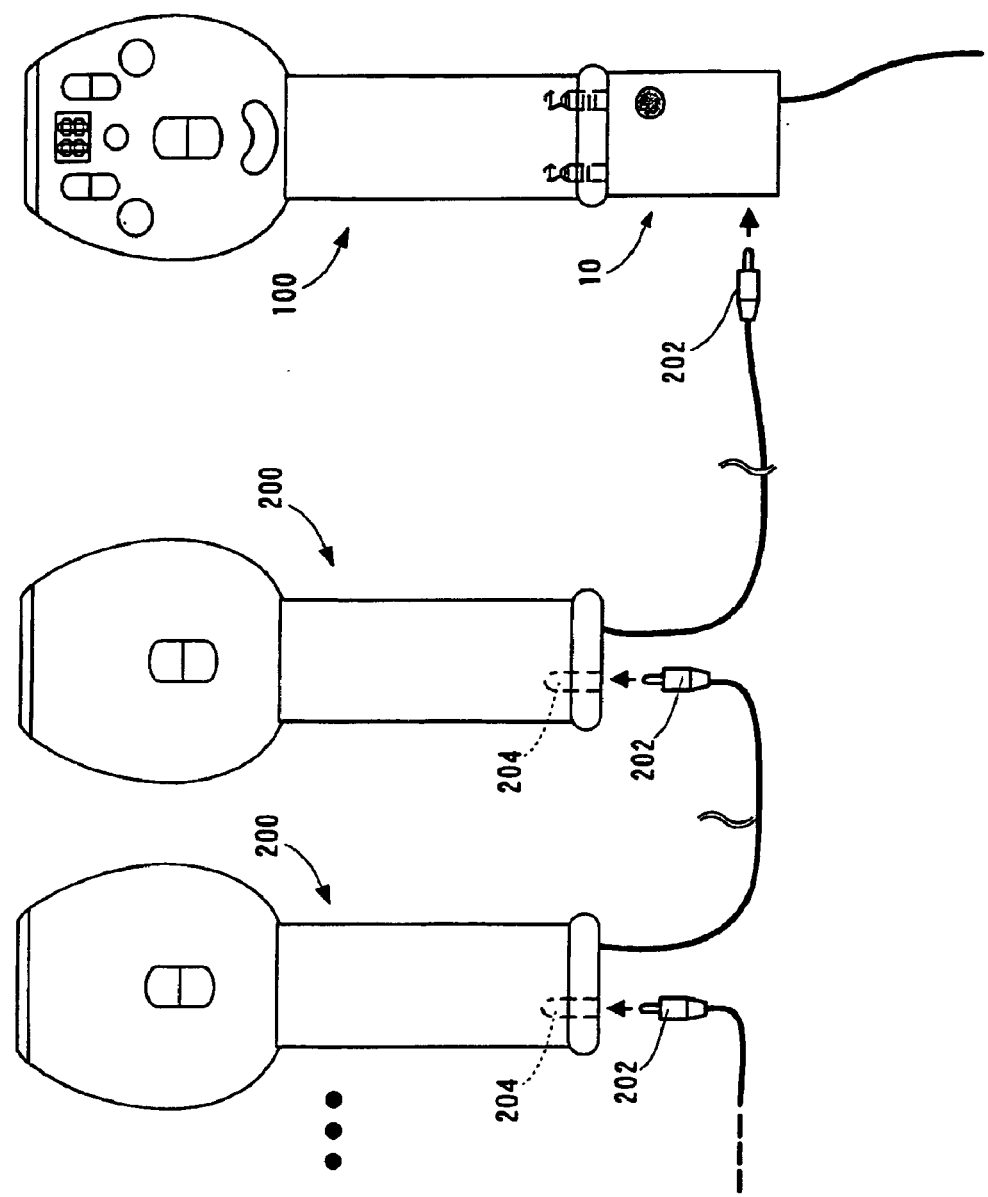
FIG. 6 is an illustrative view showing one embodiment of the present invention.

In a case that the further additional microphone 200 is connected to the additional microphone 200 as shown in FIG. 6, the microphone plug 202 of the further additional microphone 200 is inserted into the microphone jack 204 of the additional microphone 200. Therefore, the first, second and third plug terminals 202a, 202b and 202c of the further additional microphone 200 are connected to the first, second and third jack terminals 204a, 204b and 204c of the additional microphone 200, respectively. At the same time, the second jack terminal 204b of the additional microphone 200 is raised by the second plug terminal 202b of the further additional microphone 200, and the second jack terminal 204b and the connecting point 204d having been connected to each other by this time are separated. Therefore, the terminating resistor R32 of the additional microphone 200 is opened.

Due to the fact that the first plug terminal 202a of the further additional microphone 200 and the first jack terminal 204a of the additional microphone 200 are connected to each other, the constant voltage power Vcc being applied to the first plug terminal 202a of the additional microphone 200 is further applied as a drive power to the microphone 210 of the further additional microphone 200 from the line 206b of the shield wire 206 via the resistor R31 provided on the further additional microphone 200.

The audio signal from the microphone 210 of the additional microphone 200 is applied to the mixer 208 through the capacitor C31, and the audio signal from the microphone 210 of the further additional microphone 200 is outputted to the second plug terminal 202b through the capacitor C31 and the mixer 208 in the further additional microphone 200. Because the second plug terminal 202b of the further additional microphone 200 is connected to the second jack terminal 204b of the additional microphone 200, the audio signal from the microphone 210 of the further additional microphone 200 reaches the mixer 208 of the additional microphone 200 in the end. Therefore, the mixed audio signal from the microphone 210 of the two additional microphones 200 is inputted to the mixer 116 of the karaoke device 100 via the transmitter 10, and is then further mixed with the audio signal of the main body microphone 104. The mixed audio signal obtained by mixing the audio signals from the three microphones 104, 210 and 210 is amplified by the amplifier 118, and is inputted to the processor 110. Then, after a predetermined process is made, the aggregate audio signals (L) and (R) as described above are inputted to the transmitter 10 from the second connecting plug 16.

Thus, because the microphone jack 204 is provided in the additional microphone 200, it becomes possible to simultaneously use an arbitrary number of microphones only by connecting the microphone plug 202 of the further additional microphone 200 to the microphone jack 204 of the additional microphone 200. That is, unlike a case that microphones are connected to a conventional karaoke device main body by cables, the number of additional microphones is never limited depending on the number of microphone jacks.

In addition to this, because the drive power of the microphone 210 is applied from the voltage regulator 130 of the karaoke device 100 through the connection of the microphone jack 18 and the microphone plug 202 in the additional microphone 200, and in a further additional microphone 200, the drive power is applied from the voltage regulator 130 of the karaoke device 100 through the connection of the microphone jack 204 and the microphone plug 202 in the further additional microphone 200, there is no need to provide a power supply (battery) in the additional microphone 200. Furthermore, it is possible to terminate all of the microphones by the terminating resistor R31 of the additional microphone 200 to which no further additional microphone 200 is connected.

In addition, it is preferred that respective resistance values of the resistor R21 giving the power to the microphone 104 accommodated in the karaoke device 100 and the resistor R31 giving the power to the additional microphone 200 are set at the same value in order to keep the drive voltages of microphones 104 and 210 equal. In a similar manner, the resistance values of the terminating resistors R22 and R32 are preferably set at the same resistance value.

According to this embodiment, only by attaching a transmitter to a karaoke device, a microphone built-in the karaoke device can be used in a wireless environment. That is, it is possible to use a non-wireless microphone as a wireless microphone Since the power to drive a microphone and etc. incorporated into a karaoke device can be received by a first connecting plug, it is possible to utilize a power supply shared with the karaoke device. That is, a transmitter can be interlocked with a power supply control of the karaoke device. Thus, there is no need to provide a power supply and a power supply mechanism in the transmitter, and it is possible to realize a low cost.

Furthermore, since the power of the karaoke device can be supplied to an additional microphone connected to the transmitter, a power supply control of the additional microphone can be also interlocked with the karaoke device.

It is noted that in this embodiment the audio signals (L) and (R) outputted from the AV connector 140 of the karaoke device 100 are mixed in the mixing circuit 32, and the mixed audio signal (monaural signal) is modulated and amplified to be transmitted to the FM receiver 40; however the audio signals (L) and (R) may be modulated and amplified separately to be transmitted to the FM receiver 40. In other words, it is possible to deal with them in the stereophonic signals.

Furthermore, although in this embodiment the transmitter 10 is attached to the karaoke device with built-in microphone 100, it is possible to attach it to a microphone such as a conventional karaoke microphone. In such a case, a microphone is formed by deleting the processor 110, the ROM 114, the key switch 106, the display 108 and etc. from the karaoke device with built-in microphone 100 shown in FIG. 3. More specifically, it will be appropriate that the output terminal of the amplifier 118 shown in FIG. 4 is directly connected to the first jack terminal 140*a* (or the fourth jack terminal 140*d*).

In this case, by preparing a mixer in the transmitter 10, two audio signals from a microphone and an additional microphone may be mixed.

Specifically, it will be appropriate the audio signal outputted from the karaoke device 100 is received at the first plug terminal 16*a* (or 16*c*) included in the second connecting plug 16 of the transmitter 10, and by connecting the second jack terminal 18*b* of the microphone jack 18 with the connecting point P, the audio signal from the main body microphone 104 and the audio signal from the microphone 210 are mixed to each other at the connecting point P.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An RF transmitter capable of being attached to a first microphone, the first microphone having a first jack capable of supplying an electric power and a second jack for outputting an audio signal, the transmitter comprising:

a first connecting plug which is inserted into said first jack to receive said electric power;

a second connecting plug which is inserted into said second jack to receive said audio signal;

modulation means which receives said electric power and modulates said audio signal inputted from said second connecting plug; and transmitting means which receives said electric power and transmits said audio signal modulated by said modulation means to an RF receiver wherein said first jack includes a first jack terminal connected to said electric power and a second jack terminal connected to a first terminating resistor, and said first connecting plug includes a first plug terminal connected to said first jack terminal and a second plug terminal connected to said second jack terminal to open said first terminating resistor, further comprising a power supply line which receives said electric power from said first plug terminal.

2. A transmitter according to claim 1, further comprising a diode bearing an anode connected to said power supply line and a cathode connected to a reference voltage.

3. A transmitter according to claim 2, wherein said diode is a light-emitting diode arranged to allow an emission to be viewed from an external.

4. An RF transmitter capable of being attached to a first microphone, the first microphone having a first jack capable of supplying an electric power and a second jack for outputting an audio signal, the transmitter comprising:

a first connecting plug which is inserted into said first jack to receive said electric power;

a second connecting plug which is inserted into said second jack to receive said audio signal;

modulation means which receives said electric power and modulates said audio signal inputted from said second connecting plug;

transmitting means which receives said electric power and transmits said audio signal modulated by said modulation means to an RF receiver; and a microphone jack capable of connection with a second microphone different from said first microphone.

5. A transmitter according to claim 4, wherein said microphone jack includes a first microphone jack terminal connected to a first plug terminal and a second microphone jack terminal detachably connected to a second terminating resistor, when a microphone plug of said second microphone is inserted into said microphone jack, said second terminating resistor is opened.

6. An RF transmitter capable of being attached to a first microphone, the first microphone having a first jack capable of supplying an electric power and a second jack for outputting an audio signal, the transmitter comprising:

a first connecting plug which is inserted into said first jack to receive said electric power;

a second connecting plug which is inserted into said second jack to receive said audio signal;

modulation means which receives said electric power and modulates said audio signal inputted from said second connecting plug; and transmitting means which receives said electric power and transmits said audio signal modulated by said modulation means to an RF receiver, wherein said second jack of said microphone includes a third jack terminal to withdraw a first audio signal and a fourth jack terminal to withdraw a second audio signal, and said second connecting plug includes a third plug terminal and a fourth plug terminal connected to said third jack terminal and said fourth jack terminal, respectively, further comprising a mixing circuit which mixes the first audio signal from said third plug terminal and the second audio signal from said fourth plug terminal with each other to be applied to said modulation means.

* * * * *